United States Patent Office 3,035,907
Patented May 22, 1962

3,035,907
HYDROCARBON COMPOSITION CONTAINING AN ITACONIC ACID-AMINE REACTION PRODUCT
Robert E. Halter, Verona, and Joseph J. McGrath, Monroeville, Pa., assignors to Gulf Research & Development Company, Pittsburgh, Pa., a corporation of Delaware
No Drawing. Original application June 14, 1956, Ser. No. 591,298, now Patent No. 2,908,711, dated Oct. 13, 1959. Divided and this application May 4, 1959, Ser. No. 810,584
8 Claims. (Cl. 44—71)

This invention relates to novel compounded hydrocarbon compositions and more particularly, it relates to hydrocarbon compositions containing the water-insoluble product resulting from the reaction of itaconic acid and a primary or secondary amine. The hydrocarbon compositions of the invention have improved anti-rust characteristics and other valuable properties including improved storage stability, and the like.

Rusting of ferrous metals due to the presence of water as a contaminant in some hydrocarbon compositions is a serious problem in the storage, handling and use of such compositions. Although gasoline, oil and other hydrocarbons derived from petroleum are substantially free from moisture when they leave the refinery, traces of water may later be found in these products. Liquid petroleum products are frequently removed from storage tanks by water displacement, thus giving rise to the possibility of water contamination. In other instances, water can be introduced into petroleum products through faulty tank closures. Storage tanks for petroleum hydrocarbons because of their volatility must be constructed to allow room for expansion and must be provided with adequate breathing devices. Thus, as the contents of the tank contract, at night, for example, moist air is drawn in. The moisture thus drawn in condenses and settles to the bottom of the tank. The next day as the tank heats up the contents of the tank expand thus forcing out dried air. As this cycle is repeated day after day, appreciable amounts of water are collected in the bottom of the tank. Water contamination is particularly a problem in humid atmospheres such as those encountered in the tropics and on the seaboard as well as on board ships.

Liquid petroleum distillate fuels often exhibit a tendency toward instability during storage at ordinary atmospheric temperatures. For example, straight run distillate fuel oils can form sludge during storage despite their high content of normally stable paraffinic hydrocarbons. Where sludge deposition occurs in such oils, it is usually attributed to the presence in the oils of materials that are not normally present, e.g., impurities picked up during refining, or perhaps remaining in the oil due to incomplete refining, rather than to the inherent instability of the oil itself. Sludge formation in straight run fuel oils is considered to be chiefly a problem of oxidation and the formation of insoluble oxygenated products.

Distillate fuel oil compositions containing mixed straight run and catalytically cracked fuel oil distillates have proved especially troublesome with regard to sludge deposition during storage at normal atmospheric temperatures. It has been found that the sludging characteristics of such mixed, or blended, fuel oil distillates are strikingly poor, much poorer than can be accounted for from the known sludging characteristics of the individual component fuel oil distillates alone. While the sludge formed in mixed distillate fuel oils no doubt contains some sludge of the type formed in each component oil, the sludge formed in the blended fuel oils is consistently greatly in excess of the amount that can be accounted for from the known sludging tendencies of the individual component oils, thus indicating the existence of a special problem.

In accordance with the present invention, a hydrocarbon composition is provided which gives prolonged protection against rusting normally resulting when metals are exposed to hydrocarbon compositions containing water as a contaminant. Also, hydrocarbon compositions are provided which have improved storage stability.

We have found that a hydrocarbon composition can be improved with respect to its anti-rust characteristics and storage stability by incorporating in said hydrocarbon composition a small amount of the product obtained by reacting itaconic acid with an amine. We have also found that a gasoline containing the itaconic acid-amine reaction product possesses improved carburetor icing characteristics. In addition, the itaconic acid-amine reaction product possesses some utility as an anti-oxidant in various hydrocarbons including gasoline. Turbine oils containing the itaconic acid-amine reaction product exhibit improved anti-rust characteristics and color stability. Our invention, based on this discovery, thus comprises a hydrocarbon composition containing an itaconic acid-amine reaction product as a multifunctional addition agent. The itaconic acid-amine reaction product is described and claimed in our copending application Serial No. 591,298, filed June 14, 1956, now U.S. Patent No. 2,908,711. The present application is a division of said copending application.

The reaction by which the multifunctional addition agent is prepared involves at least partial amidation of itaconic acid with a primary or secondary mono- or diamine. Although the exact nature of the itaconic acid-amine reaction products has not been definitely ascertained, it has been determined that the products are largely monoamides rather than ammonium salts. The reaction is entirely conventional and is carried out according to known procedures and according to known conditions. Therefore, the reaction need only be described briefly.

In this connection, the mole ratio of the reactants can be from about 0.5 to about 2 moles of itaconic acid per mole of amine. We prefer, however, to admix the itaconic acid and amine in equimolecular proportions. When the reactants are employed in proportions other than equimolecular proportions, the product so obtained is not as effective as the product obtained with equimolecular proportions. The reactants can be reacted directly with each other or they can be reacted in the form of a solution or dispersion containing the reactants. Suitable solvents which can be employed include kerosene, benzene, toluene, hexane, methyl isobutyl ketone, methyl ethyl ketone, isopropanol, and mineral oil. The use of a solvent is particularly desirable in that localized heating is avoided. Moreover, a concentrate can be prepared which is more readily dissolved in the hydrocarbon composition to be improved.

While the amidation reaction discussed above normally takes place to some degree even at relatively low temperatures, it is desirable to employ heat of a degree at least equal to the boiling point of water, e.g., 212° F., in order to eliminate the water of reaction, and in order to force the reaction to completion. It is preferred that temperatures not substantially in excess of 350° F. be employed, since decomposition of the product may result. A preferred procedure involves terminating the reaction when the temperature of the reaction mixture reaches a degree not substantially above about 250° F., and allowing the product to cool.

Normally, the reaction is complete in about an hour, or after substantially all of the water of reaction has been removed.

The hyrocarbon composition to which the itaconic acid-amine reaction product can be added in accordance with the invention can be either liquid or solid, the latter including fats, waxes, resins and rubber. When liquid, the hydrocarbon composition can vary in volatility from light gasoline to heavy oils and greases. Within this volatility range we intend to include motor and aviation gasoline, jet fuels, diesel fuels, lubricating oils, fuel oils, slushing oils, turbine oils, transformer oils, greases, and the like. The gasoline can be a synthetic gasoline, a straight-run gasoline, a cracked gasoline, or blends thereof, and it can contain components obtained from processes other than cracking, such as components obtained from alkylation, isomerization, hydrogenation, polymerization, hydrodesulfurization, hydroforming, "Platforming," or combinations of two or more such processes.

When the hydrocarbon compositions to which the itaconic acid-amine reaction product is added is gasoline, the gasoline can contain minor amounts of other addition agents. Thus, for example, the gasoline can contain octane improving amounts of tetraethyl lead fluid. Other addition agents normally added to gasolines for a specific purpose such as an anti-oxidant, a haze inhibitor, an oiliness agent, an anti-stalling agent, a corrosion inhibitor, a lead scavenging agent, a dye, etc., can be employed without adversely affecting the improved anti-rust characteristics derived in accordance with the invention.

When the hydrocarbon composition to which the itaconic acid-amine reaction product is added is a lubricating oil, the oil can be any oil having a viscosity within the range of common lubricating oils. The oil can be a synthetic oil or a mineral oil including refined or semi-refined paraffinic, naphthenic or asphalt base oil having a viscosity of about 50 to about 4000 SUS at 100° F. If desired, the itaconic acid-amine reaction product can be added to a blend of oils of suitable viscosity instead of a single oil by means of which any desired viscosity within the range of 50 to 4000 SUS at 100° F. can be secured.

When a lubricating composition is desired the lubricating oil can contain minor amounts of other addition agents. Thus, for example, it is particularly advantageous in many instances to add an anti-foam agent to the lubricating composition. Other addition agents normally added to lubricating oils for a specific purpose such as an anti-oxidant, pour point depressant, corrosion inhibitor, viscosity index improver, oiliness and extreme pressure agent, and the like, can be employed without adversely affecting the improved characteristics derived by the composition of this invention.

When the hydrocarbon composition to which the itaconic acid-amine reaction product is added is a fuel oil, the oil can, if desired, contain in addition to the additives disclosed herein, other improvement agents. For example, fuel oil compositions may contain additional oxidation inhibitors, anti-foam agents, ignition quality improvers, flash point control agents, corrosion inhibitors, combustion improvers and other additives adapted to improve the oil in one or more respects.

As set forth hereinabove, the compounds employed in accordance with this invention are believed to be amides rather than ammonium salts and are obtained by reacting a primary or secondary amine or a diamine having an N-substituent containing at least 3 carbon atoms with itaconic acid. While the structural formula of the itaconic acid-amine reaction product has not been definitely ascertained it is believed to have the following general formula:

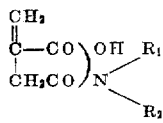

where $R_1$ is a radical containing at least 3 carbon atoms selected from the group consisting of aliphatic, aromatic, N-aliphatic, aliphatic-aromatic, aromatic-aliphatic, cycloaliphatic and heterocyclic radicals and $R_2$ is an organic radical of the same kind as $R_1$ or hydrogen. By using parenthesis in the general formula shown above, we intend to indicate that the

group can be attached to either carbonyl. Thus, the itaconic acid-amine reaction product may contain either one or both of such designated compounds. It will be understood that the R radicals may be the same or different members of the identified group and that the R radicals may also be a part of a ring compound such as in the case of morpholine, piperidine and pyrrolidine.

The amines which can be used in preparing the multi-functional addition agents which are useful in the compositions of this invention include the primary and secondary monoamines and diamines having a substituent containing at least 3 carbon atoms. Those substituents having less than 3 carbon atoms are generally less desirable because of their poor oil solubility characteristics. In general, the amines suitable for the purpose of this invention have the general formula:

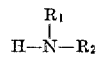

where $R_1$ and $R_2$ are as defined above. Particularly suitable are amines containing aliphatic N-substituents, including saturated, unsaturated, acyclic, cyclic and polycyclic substituents containing 3 or more carbon atoms.

Illustrative of suitable primary amines are the alkyl amines, such as hexyl, octyl, decyl, dodecyl, tetradecyl, hexadecyl, octadecyl, eicosyl and hexacosyl amines. Although amines having substituent chains containing more than 26 carbon atoms may be used, the shorter chain amines are preferred for reasons of commercial availability. Primary alkenyl amines such as heptenyl, nonenyl, undecenyl, pentadecenyl and petacosenyl are also satisfactory. Examples of suitable primary cycloaliphatic amines are cyclohexyl and substituted cyclohexyl amines. Primary, polycyclic or polynuclear aliphatic amines, such as rosin amines, or the amine of abietic acid are also satisfactory. Monocyclic aromatic amines, such as aniline, as well as polycyclic or polynuclear aromatic amines such as diphenyl amine and alpha- and beta-naphthylamines also have utility in the present invention. Benzylamine and beta-phenylethylamine are illustrative of suitable aromatic-aliphatic amines, just as toluidine and xylidine are exemplary of suitable aliphatic-aromatic amines.

Secondary amines corresponding to all of these classes of amines are also utilized to advantage and include not only secondary amines having identical substituents such as dioctylamine, dioctenylamine, dicyclohexylamine, N,N-diphenylamine, dibenzylamine, and N,N-ditolylamine, but also secondary amines having different substituents from the same class, such as N,N-octylhexadecylamine and N,N-phenylalphanaphthylamine, as well as secondary amines whose substituents are selected from different classes such as N,N-octylphenylamine, monomethyl aniline, N,N-phenylcyclohexylamine and the like.

Particularly effective addition agents are obtained when itaconic acid is reacted with a diamine in equimolecular proportions. The diamines contemplated according to the invention are preferably those having the general formula:

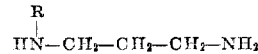

where R is an aliphatic radical containing from 8 to 30 carbon atoms. Specific examples of such diamino compounds are 3-octylaminopropylamine, 3-tetradecylaminopropylamine, 3-tetradecenylaminopropylamine, 3-eicosylaminopropylamine, 3-eicosenylaminopropylamine, 3-docosylaminopropylamine, 3-docosenylaminopropylamine, 3-docosodienylaminopropylamine, and 3-triacontanylaminopropylamine. Within the general class of 1,3-diaminopropanes which we can use, the diamines in which the long-chain aliphatic N-substituent of the secondary amino grouping is an alkyl or alkenyl group containing at least 12 and preferably from 16 to 20 carbon atoms are considered to form especially effective addition agents. Examples of the 1,3-diaminopropanes which are considered to form especially effective addition agents are the 3-dodecyl-, 3-hexadecylaminopropylamines, and especially the 18 carbon alkyl-, alkenyl-, and alkadienyl-substituted 1,3-diaminopropanes, such as the 3-octadecyl-, 3-octadecenyl-, and 3-octadecadienylaminopropylamines. Mixtures of 1,3-diaminopropanes such as are formed when the long-chain, aliphatic N-substituent in the secondary amino grouping is derived from mixed fatty acids obtained from naturally occurring fats and oils, form highly effective addition agents for use in compositions of the invention. In such instances the aliphatic N-substituent in the secondary amino grouping will be a straight-chain, monovalent hydrocarbon radical containing from 8 to 20 carbon atoms. Examples of such mixtures of 1,3-diaminopropanes are 3-"tallow"-aminopropylamine, 3-"soya"-aminopropylamine, and 3 - "coco" - aminopropylamine, where the respective N-substituents are mixed alkyl and unsaturated alkyl groups derived from animal tallow ($C_{14}$–$C_{18}$) fatty acids, soybean ($C_{16}$–$C_{20}$) fatty acids, and coconut ($C_8$–$C_{18}$) fatty acids.

Among the numerous classes of amines suitable for the purposes of this invention, the commercial mixtures of high molecular weight amines derived according to conventional methods from naturally occurring substances, such as coconut oil, palm oil, soybean oil, animal fats, rosin and the like, are distinctly preferred.

The reaction products can be incorporated in the hydrocarbon composition in any suitable manner. Thus, the reaction products may be formed in situ in the hydrocarbon composition, they may be added, per se, directly to the hydrocarbon composition, or they may be added in the form of concentrates. The concentrate when prepared for addition to gasoline can also contain an organometallic anti-knock agent, such as tetraethyl lead, a metal scavenging agent, an oxidation inhibitor, an anti-freeze agent, an upper cylinder lubricant, a dye, and the like. Similarly, the concentrate when prepared for addition to fuel oils can also contain oxidation inhibitors, flash point control agents, corrosion inhibitors, anti-foam agents, ignition improvers, combustion improvers and other additives adapted to improve the oils in one or more respects. Regardless of the nature of the hydrocarbon composition to which the itaconic acid-amine reaction product is to be added, it is generally preferred to employ the reaction product in the form of a concentrate in the blending procedure.

Suitable concentrates containing the addition agents for use in compositions of this invention comprise, for example, mineral oil solutions or dispersions containing from about 10 to about 75 weight percent, and preferably from about 25 to about 50 weight percent active ingredient. Where the concentrates are in the form of dispersions it may be desired to heat the concentrates and/or the hydrocarbon composition, e.g., in the case of a fuel oil to about 100° to about 140° F. in order to facilitate blending. An alternate blending procedure involves incorporating in the hydrocarbon composition at storage temperature concentrated solutions of the itaconic acid-amine reaction product in solvents, other than mineral oils, that have a high degree of solubility for the reaction product and that do not adversely affect the stability or other characteristics of the hydrocarbon composition. Examples of such concentrates are 10 to 75 weight percent, e.g., 40 to 50 weight percent, solutions of itaconic acid-amine reaction product in solvents such as benzene, toluene, hexane, methyl isobutyl ketone, methyl ethyl ketone, mineral oil and isopropanol.

The reaction product obtained when itaconic acid is reacted with an amine is highly suited for use in fuels in view of the ashless characteristic of the reaction product.

Naturally, the various compounds of the herein disclosed class do not possess exactly identical effectiveness, and the most advantageous concentration for each such compound will depend to some extent upon the particular compound used. Also, the minimum effective inhibitor concentration may vary somewhat according to the specific nature of the hydrocarbon composition to which it is added as well as the purpose for which it is added. When the fuel is gasoline, we have obtained highly satisfactory anti-rust characteristics when the reaction product was employed in amounts of from 1 to 20 pounds per thousand barrels of gasoline. Particularly good results have been obtained with the reaction product of Example 1 in concentrations of 3 to 10 pounds per thousand barrels. Somewhat larger amounts may be required for other specific purposes. For example, in order to improve the oxidation stability of gasoline, the itaconic acid-amine reaction product may be required in amounts up to 0.5 to 1.0 percent or more. The amount of the multifunctional additive based on the weight of the fuel also will vary to some extent depending upon the specific gravity of the fuel. Based upon a jet engine fuel having an API gravity of 50.5, 1 to 20 pounds per thousand barrels corresponds respectively to about 0.0004 to about 0.008 percent by weight. Based upon a motor gasoline having an API gravity of 60.5, 1 to 20 pounds per thousand barrels corresponds respectively to about 0.0005 to about 0.01 percent by weight. Somewhat larger amounts may be employed in fuels for various purposes including stabilization and carburetor icing improvers. When the hydrocarbon composition is a fuel oil, we have obtained highly satisfactory anti-sludging characteristics with as little as about 0.005 percent to about 1.0 percent by weight of the composition. Major improvement of the storage stability characteristics of fuel oil is usually obtainable by incorporation therein of from about 0.01 to about 0.05 percent by weight of the herein disclosed products. In any event, we employ an amount of the reaction product sufficient to meet the particular purpose for which it is added such as to inhibit or substantially prevent rusting of ferrous metal surfaces or to inhibit or substantially prevent sludge formation. We have found that the incorporation of the reaction products in gasoline in amounts of about 20 pounds per thousand barrels has no deleterious effect on the other desirable characteristics of the fuel. Also, we have found that 1.0 percent of the reaction products in fuel oil has no deleterious effect on its desirable burning quality.

The preparation of the reaction products useful in the compositions of this invention, described in general, supra, is further illustrated by the following specific examples.

EXAMPLE 1

Approximately 40.1 grams (0.1 mole) of 3-"soya"-aminopropylamine and 13 grams (0.1 mole) of itaconic acid were added to a flask containing 150 ml. of anhydrous tolene. The flask was fitted with a Dean-Stark trap and condenser. The reaction mass was heated under refluxing conditions at a temperature of about 110° C. until the calculated amount, about 1.8 ml., of water was collected in the trap. The reaction took place in a period of about 60 minutes. The reaction mixture was then placed under a reduced pressure to remove the toluene. The product thus obtained was a tan colored waxy solid.

The 3-"soya"-aminopropylamine employed in this example contained approximately 80 percent diamines and was made up of a mixture of 3-fatty alkyl- and alkenyl-aminopropylamines. The mixture had a theoretical molecular weight of 321, a combining weight of approximately 402 and a melting range of approximately 38° to 42° C. The fatty alkyl and alkenyl substituents of the mixed diamines were derived from soybean fatty acids. Accordingly, the 3-"soya"-aminopropylamine contained predominantly 3-linoleylaminopropylamine together with lesser proportions of 3-oleylaminopropylamine, and small amounts of 3-palmityl-, 3-stearyl- and 3-linolenyl-aminopropylamines.

EXAMPLE 2

Approximately 13 grams (0.1 mole) of itaconic acid and 31.3 grams (0.1 mole) of Armeen S were added to a flask containing 150 ml. of anhydrous toluene. The flask was fitted with a Dean-Stark trap and condenser. The reaction mass thus formed was heated under refluxing conditions at a temperature of about 110° C. for about 60 minutes until the calculated amount, about 1.8 ml., of water was collected in the trap. The reaction mixture was then placed under a reduced pressure to remove the toluene. The product thus obtained was a tan colored waxy solid. The Armeen S employed in this example was a commercial mixture containing approximately 85 percent of long chain primary amines. Armeen S is manufactured by Armour & Company, Chicago, Illinois. The mixture was made up of fatty alkyl- and alkenyl-amines. The mixture had a theoretical molecular weight of 266, a combining weight of 313 and an approximate melting point of 31° C. The fatty alkyl and alkenyl substituents consisted predominantly of $C_{16}$ and $C_{18}$. The mixture of amines consisted of about 45 percent linoleyl-amine (octadecadienylamine), 35 percent oleylamine (octadecenylamine) and 10 percent of each of stearyl- and palmityl-amines.

EXAMPLE 3

Approximately 13 grams (0.1 mole) of itaconic acid and 24.1 grams (0.1 mole) of hexadecylamine were added to a flask containing 150 ml. of anhydrous toluene. The flask was fitted with a Dean-Stark trap and condenser. The reaction mass thus formed was heated under refluxing conditions at a temperature of about 110° C. for about 60 minutes until the calculated amount, about 1.8 ml., of water was collected in the trap. The reaction mixture was then placed under a reduced pressure to remove the toluene. The product thus obtained was a tan colored waxy solid.

The reaction products obtained in accordance with the immediate preceding examples have the following typical analyses:

*Typical Analyses of the Reaction Products*

|  | Example 1 | Example 2 | Example 3 |
|---|---|---|---|
| Molecular weight: |  |  |  |
| Calculated | 433.1 | 378.1 | 353 |
| Observed | 527 | 368 | 358 |
| Neutralization value total acid number: |  |  |  |
| Calculated | 129.4 | 148.3 | 157.4 |
| Observed | 84 | 121 | 154 |
| Nitrogen, percent: |  |  |  |
| Calculated | 6.46 | 3.70 | 3.92 |
| Observed | 5.45 | 3.69 | 3.83 |

As indicated hereinabove, it is often desirable to prepare the reaction product for use according to this invention in the form of a concentrate. The resulting concentrate can then be blended with the desired vehicle in the desired proportions. Solution of the reaction product in the ultimate carrier therefore is often greatly facilitated by this expedient. When such a concentrate is prepared such as a mineral oil concentrate it can contain from 1 percent up to the limit of solubility of the product. The preparation of concentrates containing from 40 to 50 percent by weight of the reaction product is illustrated by the following examples.

EXAMPLE 4

A 40 percent concentrate in a Texas oil was prepared by placing 80.2 grams (0.2 mole) of 3-"soya"-aminopropylamine and 153.9 grams of 100/2 Texas oil in a 600 ml. beaker. The contents of the beaker were slowly heated to 100° C. with agitation. To the heated reaction mass were then added 26 grams (0.2 mole) of itaconic acid over a period of 5 minutes. As a result of the exothermic reaction which took place the temperature increased to 130° C. This temperature was maintained for one hour to remove the water of reaction. The concentrate was then cooled to room temperature.

EXAMPLE 5

A 40 percent concentrate in a mineral seal oil was prepared by placing 80.2 grams (0.2 mole) of 3-"soya"-aminopropylamine and 153.9 grams of mineral seal oil in a 600 ml. beaker. The contents of the beaker were slowly heated to 100° C. with agitation. To the heated reaction mass were then added 26 grams (0.2 mole) of itaconic acid over a period of 5 minutes. As a result of the exothermic reaction which took place the temperature increased to 130° C. This temperature was maintained for one hour to remove the water of reaction. The concentrate was then cooled to room temperature.

EXAMPLE 6

A 50 percent concentrate in isopropanol was prepared by placing 80.2 grams (0.2 mole) of 3-"soya"-aminopropylamine in a 600 ml. beaker. The contents of the beaker were slowly heated to 100° C. with agitation. To the heated reaction mass were then added 26 grams (0.2 mole) of itaconic acid over a period of 5 minutes. As a result of the exothermic reaction which took place the temperature increased to 130° C. This temperature was maintained for one hour to remove the water of reaction. The reaction mass was then slowly cooled. When the reaction mass had cooled to about 60° C., 102 grams of isopropanol were added with stirring. The concentrate was then further cooled to room temperature.

The concentrates prepared in accordance with the immediate preceding examples have the following typical properties:

*Inspection of Additive Concentrates*

| Inspections | Example 4 | Example 5 | Example 6 |
|---|---|---|---|
|  | 40% additive in 100/2 Texas oil | 40% additive in mineral seal oil | 50% additive in isopropanol |
| Gravity, ° API | 28.3 | 40.4 | 28.1. |
| Viscosity, SUS: |  |  |  |
| 100° F | 12,287 | (¹) | 161. |
| 210° F | 226 | 145 | 92.5.² |
| Flash, OC, ° F | 375 | 290 | 55. |
| Fire, OC, ° F | 380 | 310 |  |
| Pour point, ° F | +40 | +75 | +15. |
| Physical state | Viscous slurry | Viscous slurry | Fluid liquid. |
| Color, ASTM union | 7 minus | 5 minus | 4.5 minus. |
| Nitrogen, percent | 2.16 | 2.39 | 2.70. |
| Water by dist'n, percent | 0.2 | Trace | 0.15. |
| Neutralization value total acid number | 40.05 | 42.18 | 49.20. |
| pH Value | 7.28 | 7.21 | 7.40. |
| Ash, percent | <0.01 | <0.01 | <0.01. |

¹ Too viscous to determine at 100° F.
² Obtained at 130° F., material boils at 210° F.

In order to illustrate the improved anti-rust characteristics obtained in accordance with the invention gasolines containing the reaction products obtained in Example 1, Example 2 and Example 3 have been compared with a gasoline containing no anti-rust agent and with a gasoline containing a commercially available anti-rust agent. The comparison was made by placing 6" x ¾" SAE 1020 sand blasted solvent rinsed steel strips in contact with mixtures of water and gasoline for prolonged periods of time. The steel strips were then examined for rust formation. In making the determinations, 400 ml. of gasoline and 100 ml. of distilled water were placed in a glass container. Steel strips were placed in the container so that part of the strip was in the water layer, another part in the gasoline layer, and a further part in the air space above the liquid. The container was tightly sealed and then violently agitated for about one minute. The container was then stored in the dark at room temperature without further agitation. Steel strips were removed from the container at different intervals to determine the amount of rust formed on the various segments. Steel specimens which were completely free from rust were given an anti-rust rating of 100. Steel strips which were completely covered with rust were given an anti-rust rating of zero.

Table I summarizes the results obtained with a regular grade leaded gasoline containing the various additives in concentrations as shown.

TABLE I

| Additive | Concentration lb./1,000 bbl. | Time in Days |  |  |  |
|---|---|---|---|---|---|
|  |  | 0 | 1 | 12 | 42 |
|  |  | Anti-rust rating |  |  |  |
| None | | 100 | 77 | 70 | 61 |
| Commercial anti-rust | 10 | 100 | 85 | 70 | 69 |
| Product of Example 1 | 3 | 100 | 100 | 100 | 100 |
| Do | 7 | 100 | 100 | 100 | 100 |
| Product of Example 2 | 3 | 100 | 88 | 70 | 68 |
| Do | 7 | 100 | 100 | 100 | 66 |
| Product of Example 3 | 3 | 100 | 100 | 72 | 70 |
| Do | 7 | 100 | 100 | 100 | 100 |

The improved results obtained in accordance with our invention are apparent from the summary of data in Table I. It will be noted that improved anti-rust characteristics were imparted to the gasoline when the additives were employed in concentration of 3 to 7 pounds per thousand barrels of gasoline. It will be further noted that the protection obtained with from 3 to 7 pounds of the itaconic acid-amine reaction product was at least equal to or greater than the protection obtained with 10 pounds of the commercial anti-rust agent. It will be still further noted that the product of Example 1 is a preferred product in that an excellent anti-rust rating was obtained with a smaller amount of addition agent than was obtained with any of the other compositions.

The physical characteristics of gasoline are not substantially changed by the addition of the compounds of the invention as evidenced by the data in Table II.

TABLE II

| Inspections | Gasoline | Gasoline +20 lb./1,000 bbl., product of Example 1 |
|---|---|---|
| Gravity, ° API | 60.6 | 60.6 |
| Sp. gravity, 60°/60° F | 0.7366 | 0.7366 |
| Color, Lovibond, 6" cell 200 red series | 30 | 29 |
| Doctor, Fed. 520.3.2 | Sweet | Sweet |
| Sulfur, percent | 0.050 | 0.044 |
| Copper strip test, 122° F. 3 hr | Blank | Blank |
| Copper dish gum, mg/100 ml | 272.3 | 268.4 |
| Oxidation stability, min | 442 | 465 |
| Bromine Number | 61.6 | 60.6 |
| Knock rating: |  |  |
| Motor method | 86.6 | 86.7 |
| Research method | 97.1 | 97.3 |

When the product of Example 1 was added to an aviation fuel and to a JP-4 fuel in concentrations of 20 lb./1000 bbl., the physical characteristics of the respective fuels were not deleteriously affected. It will be noted that the reaction product of Example 1 had a beneficial effect on the oxygen stability of the gasoline even though the gasoline was already fairly stable.

The utility of the herein disclosed class of compounds as sludge inhibitors in distillate fuel oils has been demonstrated by subjecting samples of a blend of catalytically cracked and straight run fuel oil distillates containing the adduct of Example 1 to a standard accelerated stability test. The test samples were made by adding the desired concentration of addition agent to be tested directly to separate samples of fuel oil blends which had the following properties:

|  | Blend A [1] | Blend B [2] |
|---|---|---|
| Gravity, ° API | 31.2 | 32.1 |
| Viscosity, SUS at 100° F | 34.2 | 33.4 |
| Color, NPA | 2— | 2— |
| Pour point, ° F | −20 | −25 |
| Flash point, ° F | 170 | 178 |
| Carbon residue, Conradson on 10% bottoms, percent | 0.44 | 0.49 |
| Neutralization value, acid number | 0.01 | 0.01 |
| Distillation: |  |  |
| Initial boiling point, ° F | 378 | 385 |
| End boiling point, ° F | 619 | 620 |
| Bromine Number | 12.5 | 7.3 |
| Olefins, vol. percent | 4.7 | 9.5 |
| Aromatic, vol. percent | 43.1 | 37.8 |
| Aniline point | 112 | 116 |
| Ash, oxide, weight percent | <0.01 | <0.01 |

[1] Blend A—2:2:1 (vol.) blend of West Texas Straight Run, fluid catalytically cracked gas oil and No. 2 fuel oil distillate from Thermofor catalytic cracking.
[2] Blend B—2:1:1 (vol.) blend of West Texas Straight Run, fluid catalytically cracked gas oil and No. 2 fuel oil distillate from Thermofor catalytic cracking.

The stability test referred to was carried out on the mixed fuel oil compositions by heating 600 gram samples of fuel oil compositions for periods ranging from 16 to 64 hours at 210° F. in loosely stoppered, one-quart clear glass bottles. Following the heating periods the test samples were cooled to room temperature and filtered by suction through tared, medium porosity fritted glass Gooch-type crucibles. The sludge in each crucible was washed with heptane. Complete removal of the sludge adhering to the inside of the bottles was obtained by means of a rubber policeman and heptane. The respective crucibles were dried in an oven maintained at 210° F. for 1 hour, cooled in a desiccator and reweighed. The increase in weight was recorded as milligrams of sludge per 600 grams of oil.

As illustrating the improvement obtainable when the itaconic acid-amine reaction product is added to a fuel oil, the specific results obtained by testing mixed fuel oil compositions containing the reaction product described in Example 1 are set forth in Table III below:

TABLE III

|  | Sludge, mg./600 gm. oil |  |  |  |  |
|---|---|---|---|---|---|
|  | After 16 hrs. | After 24 hrs. | After 40 hrs. | After 48 hrs. | After 64 hrs. |
| 1. Blend A | 28.1 | 54 | 79 | 98 | 94 |
| 2. Blend A +0.05% by weight reaction product of Ex. 1 | 0.3 | 1.6 | 32.4 | 44.5 | 38.5 |
| 3. Blend B | 46.1 |  | 87.6 |  |  |
| 4. Blend B +0.05% by weight reaction product of Ex. 1 | 1.7 |  | 44.2 |  |  |

Compositions 2 and 4 in the foregoing table are specific embodiments of the invention. Comparison of the results set forth in the table for these compositions with those obtained for blank compositions 1 and 3 indicates the major improvement obtainable. The foregoing results are considered to be typical of the preferred additives for use in compositions of the invention. Similar results are obtainable with other reaction products of the herein disclosed class, specific examples of which are the reaction products of 3-dodecylaminopropylamine, 3-tetradecylaminopropylamine, 3-hexadecylaminopropylamine, 3-octadecylaminopropylamine, 3-octadecenylaminopropylamine, hexadecylamine, hexylamine, octylamine, decylamine, dodecylamine, octadecylamine, eicosylamine, hexacosylamine, dioctylamine, dioctenylamine, dicyclohexaylamine, N,N-diphenylamine, N,N-octylhexadecylamine, N,N-octylphenylamine and N,N-phenylcyclohexylamine with itaconic acid in ratios of 1 to 2 moles of itaconic acid per mole of amine. Other examples of fuel oil compositions included by the invention are mixtures of catalytically cracked and straight run fuel oil where the volume ratio of cracked to straight run oil is from 9:1 to 1:9 containing from 0.005 to 1.0 percent by weight of the above-named reaction products.

While our invention is described above with reference to various specific examples and embodiments, it will be understood that the invention is not limited to such examples and embodiments and may be variously practiced within the scope of the claims hereinafter made.

We claim:
1. A hydrocarbon composition comprising a major proportion of a hydrocarbon selected from the group consisting of oils, fats, waxes, resins and rubber and from 0.0004 to about 1.0 percent by weight of the product obtained by reacting itaconic acid with a diamine having the general formula:

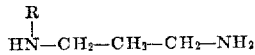

where R is an aliphatic hydrocarbon radical containing from 8 to 30 carbon atoms, the ratio of reactants being from about 0.5 to about 2 moles of itaconic acid per mole of diamine, the reaction being conducted under substantially anhydrous conditions at a temperature at least equal to the boiling point of water to eliminate the water of reaction substantially as fast as it is formed.

2. A liquid hydrocarbon composition comprising a major proportion of a liquid hydrocarbon normally tending to rust ferrous metals when contaminated with water and a small amount, sufficient to substantially retard such rusting, of the product obtained by reacting itaconic acid with a diamine having the general formula:

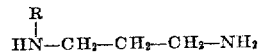

where R is an aliphatic hydrocarbon radical containing from 8 to 30 carbon atoms, the ratio of reactants being from about 0.5 to about 2 moles of itaconic acid per mole of diamine, the reaction being conducted under substantially anhydrous conditions at a temperature at least equal to the boiling point of water to eliminate the water of reaction substantially as fast as it is formed.

3. A fuel oil composition comprising a major proportion of a distillate fuel oil tending to deposit sludge and a small amount, sufficient to inhibit sludge deposition, of the product obtained by reacting itaconic acid with a diamine having the general formula:

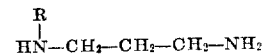

where R is an an aliphatic hydrocarbon radical containing from 8 to 30 carbon atoms, the ratio of reactants being from about 0.5 to about 2 moles of itaconic acid per mole of diamine, the reaction being conducted under substantially anhydrous conditions at a temperature at least equal to the boiling point of water to eliminate the water of reaction substantially as fast as it is formed.

4. A gasoline fuel comprising a major proportion of gasoline normally tending to rust ferrous metals when contaminated with water and a small amount, sufficient to substantially retard such rusting, of the product obtained by reacting itaconic acid with a diamine having the general formula:

$$HN(R)-CH_2-CH_2-CH_2-NH_2$$

where R is an aliphatic hydrocarbon radical containing from 8 to 30 carbon atoms, the ratio of reactants being from about 0.5 to about 2 moles of itaconic acid per mole of diamine, the reaction being conducted under substantially anhydrous conditions at a temperature at least equal to the boiling point of water to eliminate the water of reaction substantially as fast as it is formed.

5. A fuel oil composition comprising a major proportion of a mixture of straight run and catalytically cracked distillate fuel oils tending to deposit sludge and a small amount, sufficient to inhibit sludge deposition, of the product obtained by reacting equimolecular proportions of itaconic acid and mixed 3-alkyl- and 3-alkenyl-aminopropylamines whose alkyl and alkenyl substituents contain from 16 to 18 carbon atoms, the reaction being conducted under substantially anhydrous conditions at a temperature at least equal to the boiling point of water to eliminate the water of reaction substantially as fast as it is formed.

6. The fuel oil composition of claim 5 wherein said small amount is between about 0.005 and about 1.0 percent by weight of said mixture of fuel oils.

7. A gasoline fuel having improved anti-rust characteristics containing about 1 to about 20 pounds per thousand barrels of gasoline of the product obtained by reacting equimolecular proportions of itaconic acid and mixed 3-alkyl- and 3-alkenyl-aminopropylamines whose alkyl and alkenyl substituents contain from 16 to 18 carbon atoms, the reaction being conducted under substantially anhydrous conditions at a temperature at least equal to the boiling point of water to eliminate the water of reaction substantially as fast as it is formed.

8. A gasoline fuel having improved anti-rust characteristics containing about 1 to about 20 pounds per thousand barrels of gasoline of the product obtained by reacting equimolecular proportions of itaconic acid and mixed alkyl- and alkenyl-amines whose alkyl and alkenyl substituents contain from 16 to 18 carbon atoms, the reaction being conducted under substantially anhydrous conditions at a temperature at least equal to the boiling point of water to eliminate the water of reaction substantially as fast as it is formed.

References Cited in the file of this patent
UNITED STATES PATENTS

| | | |
|---|---|---|
| 1,789,302 | Calcott et al. | Jan. 20, 1931 |
| 1,941,689 | Jaeger | Jan. 2, 1934 |
| 2,063,516 | Morrell | Dec. 8, 1936 |
| 2,604,451 | Rocchini | July 22, 1952 |
| 2,699,427 | Smith et al. | Jan. 11, 1955 |